J. D. CULP.
KNITTED BAGS FOR PACKAGES OF COMPRESSED VEGETABLE SUBSTANCES.
No. 6,779.
Reissued Dec. 7, 1875.
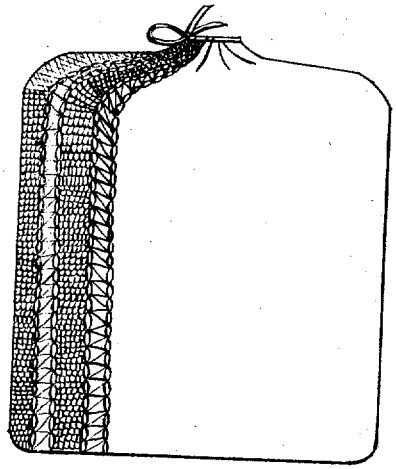
Attest
Charles Thurman.
R. A. Dyer
Inventor
James D. Culp.
by Geo. W. Dyer
Attyp.
N. PETERS, PHOTO-LITHOGRAPHER, WASHINGTON, D. C.

UNITED STATES PATENT OFFICE.

JAMES D. CULP, OF GILROY, ASSIGNOR TO THE CONSOLIDATED TOBACCO COMPANY, OF SAN FRANCISCO AND GILROY, CALIFORNIA.

IMPROVEMENT IN KNITTED BAGS FOR PACKAGES OF COMPRESSED VEGETABLE SUBSTANCES.

Specification forming part of Letters Patent No. 162,353, dated April 20, 1875; reissue No. 6,779, dated December 7, 1875; application filed November 4, 1875.

*To all whom it may concern:*

Be it known that I, JAMES D. CULP, of Gilroy, State of California, have invented an Improved Sack for Putting Up Packages of Tobacco and like substances of a granular nature, of which the following is a specification:

My invention consists in the construction and use of an elastic sack of knit fabric, for putting up in packages granulated tobacco and other substances of a like nature; and it is designed as an improvement over the sacks and bags heretofore used for this purpose that have no yielding or elastic qualities, as will more fully appear in the following description.

Heretofore, it has been the custom to put up granulated smoking-tobacco for transportation and use in sacks, made from linen or cotton cloth, having little or no elasticity; but by the usual method of packing the substance in the sacks, their use was attended with many objections. The tobacco is usually put up in packages by employing a hollow metallic cylinder, open at both ends, of about the diameter of the package to be made, and corresponding, also, to the size of a piston worked by a press. The sack to be filled is drawn over the lower end of the cylinder, and the required quantity of tobacco is weighed and put into the upper end of the cylinder. The cylinder and its contents are thus surrounded by the sack, and the lower end is covered by its bottom. The cylinder is then placed upon a platform beneath the piston of the press, and the tobacco is forced down and pressed into a solid mass by means of pressure applied to the piston. This pressure is then removed, and the cylinder is raised up and held at an elevated position above the platform, when pressure is again applied to the piston, and the compressed mass of tobacco is forced through and out of the cylinder, carrying with it the sack, that is thus stripped off the cylinder.

By these means the sacks are firmly packed and filled with the tobacco, and the metallic cylinder must be used, as no sack would stand the pressure required to compress the tobacco.

Heretofore, the sacks used in putting up tobacco have been made of nearly non-elastic material, and have, for this reason, been defective, and occasioning considerable loss and trouble in the process of packing the tobacco. If they are made the least trifle larger than the cylinder over which they are drawn, they will not stay upon it well, and, after being filled, the package made is loose, and larger than the proper size; while, if the sacks are too small, they cannot be drawn over the cylinder at all, and therefore become an entire loss—the loss on this account in the use of such non-elastic sacks usually averaging about one-eighth of the number of sacks made.

My improvement consists in making these sacks of knit fabric, and thereby rendering them elastic, and also capable of properly holding the compressed tobacco.

I construct them by first making a seamless tube of the required diameter, by knitting or weaving it in a machine, and then cutting the tube into pieces of the required length, each piece corresponding to the length of the package to be formed. One end of each of these pieces is then sewed or closed up, and the sacks are ready for use.

It is important that the tube should be of the same diameter throughout, in order to make the sacks of uniform size; but this is perfectly accomplished by forming the tube by machinery.

My sacks thus formed possess many advantages, by reason of their elasticity and the manner of making them. Being knit or woven by machinery, they are without longitudinal seams to impair their strength, and they are of uniform size, so that when filled with the same quantity of tobacco, they will form packages of the same size both as to length and diameter. If they are smaller than the metallic cylinder used in filling them, they can be drawn over it by reason of their being elastic, and the waste or loss on account of irregular sizes thus avoided.

On account of the loose texture of the sack, the tobacco, if too damp when put up, as often happens, will dry out and not mildew. The label also sticks to them better than to other sacks, and it costs less to make them.

When tobacco is packed in sacks, it is desirable to close the mouth or opening of the sack in such a manner that the contents can be readily got at for examination or use; but in those of ordinary kind the texture holds the strings that are run through it around the opening, so as to make it difficult to open the sack without breaking the strings; while in elastic sacks made according to my invention the strings easily slide through the loose texture of the sack, and facilitate the opening and closing.

The elastic sacks are more easily filled with tobacco than others, and by their use the saving in the labor of packing and in the cost of sacks is not less than twenty per cent. of entire cost of packing over the ordinary kind of sacks.

My elastic sack is also adapted to put up other articles or substances that are pressed into masses or packages, such as dried fruit of different kinds, herbs for medicinal use, &c.

Having thus described my invention, what I claim, and desire to secure by Letters Patent, is—

As a new article of manufacture, knit sacks for packing purposes, substantially as described.

JAMES D. CULP. [L. S.]

Witnesses:

C. W. M. SMITH,

ALFRED C. CRANE.